United States Patent
Asirvatham et al.

(10) Patent No.: US 11,299,580 B2
(45) Date of Patent: Apr. 12, 2022

(54) THIXOTROPIC RHEOLOGY MODIFYING AGENT COMPOSITIONS

(71) Applicant: AdvanSix Resins & Chemicals LLC, Parsippany, NJ (US)

(72) Inventors: Edward Asirvatham, Chatham, NJ (US); Jaime A. Flores-Vasquez, Glen Allen, VA (US); Karttikay Moudgil, Johns Creek, GA (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 16 days.

(21) Appl. No.: 16/981,191

(22) PCT Filed: Mar. 25, 2019

(86) PCT No.: PCT/US2019/023909
§ 371 (c)(1),
(2) Date: Sep. 15, 2020

(87) PCT Pub. No.: WO2019/190997
PCT Pub. Date: Oct. 3, 2019

(65) Prior Publication Data
US 2021/0024683 A1   Jan. 28, 2021

Related U.S. Application Data

(60) Provisional application No. 62/648,630, filed on Mar. 27, 2018.

(51) Int. Cl.
| | |
|---|---|
| *C08G 18/76* | (2006.01) |
| *C08G 18/22* | (2006.01) |
| *C08G 18/28* | (2006.01) |
| *C08G 18/32* | (2006.01) |
| *C08K 5/3412* | (2006.01) |
| *C09D 5/04* | (2006.01) |
| *C09D 7/45* | (2018.01) |
| *C08J 3/09* | (2006.01) |
| *C08L 75/02* | (2006.01) |
| *C09D 7/47* | (2018.01) |
| *C08G 18/80* | (2006.01) |
| *C08L 75/04* | (2006.01) |

(52) U.S. Cl.
CPC ....... *C08G 18/7621* (2013.01); *C08G 18/225* (2013.01); *C08G 18/282* (2013.01); *C08G 18/283* (2013.01); *C08G 18/2835* (2013.01); *C08G 18/324* (2013.01); *C08G 18/3228* (2013.01); *C08G 18/8038* (2013.01); *C08J 3/096* (2013.01); *C08K 5/3412* (2013.01); *C08L 75/02* (2013.01); *C08L 75/04* (2013.01); *C09D 5/04* (2013.01); *C09D 7/45* (2018.01); *C09D 7/47* (2018.01)

(58) Field of Classification Search
CPC .............. C08G 18/7621; C08G 18/225; C08G 18/282; C08G 18/2835; C08G 18/3228; C08G 18/324; C08G 18/283; C08G 18/8038; C08K 5/3412; C09D 5/04; C09D 7/45; C09D 7/47; C08L 75/02; C08L 75/04; C08J 3/096
See application file for complete search history.

(56) References Cited

U.S. PATENT DOCUMENTS

| | | | |
|---|---|---|---|
| 2010/0204430 A1* | 8/2010 | Marc | C08G 18/0895 528/61 |
| 2020/0223974 A1* | 7/2020 | Asirvatham | C08G 18/8077 |

FOREIGN PATENT DOCUMENTS

DE   102007028890 A1 *   5/2008   ............. C08G 18/12

* cited by examiner

*Primary Examiner* — Rabon A Sergent
(74) *Attorney, Agent, or Firm* — Faegre, Drinker, Biddle & Reath LLP

(57) ABSTRACT

Solvents that are suitable for use with polyurethane-polyurea based rheology modifying agents of the type which, in the past, have generally been formulated as solids or viscous liquids. The present solvents enable the rheology modifying agents to be prepared and formulated in a liquid or solution form more suited to prepare coating formulations that include polyurethane-polyurea based rheology modifying agents. The present solvents are N-alkyl substituted caprolactams, including N-methyl caprolactam, N-ethyl caprolactam, N-butyl caprolactam, and mixtures thereof, which are aprotic, non-toxic, have good solvency for polar groups such as those found in polyurethanes and polyureas, are thermally stable, and have high boiling points and low vapor pressure.

20 Claims, No Drawings

THIXOTROPIC RHEOLOGY MODIFYING AGENT COMPOSITIONS

CROSS REFERENCE TO RELATED APPLICATIONS

This application is a US. 371 National Stage application of International Application No. PCT/US2019/023909, filed 25 Mar. 2019, entitled THIXOTROPIC RHEOLOGY MODIFYING AGENT COMPOSITIONS, which claims the benefit of U.S. Provisional Patent Application Ser. No. 62/648,630, filed Mar. 27, 2018, entitled THIXOTROPIC RHEOLOGY MODIFYING AGENT COMPOSITIONS, the disclosures of which are incorporated by reference herein in their entireties.

FIELD

The present disclosure relates to rheology modifying agents and, in particular, to solvents which are suitable for use with polyurethane-polyurea based rheology modifying agents, and the use of such solvents in the preparation of rheology modifying agents.

BACKGROUND

Rheology modifying agents enable or improve the flow characteristics of paints and coatings, to prevent the coatings from sagging during application, and to avoid settling of pigments which are used in pigmented paints and coatings. Rheology modifying agents are suitable for use in coatings containing primary components such as polyurethanes, polyurethane/polyurea, polyurethanes with blocked isocyanates, and polyurethane-polyether/polyester/polycarbonate/polyamide binders, for example.

Preparation of polyurethane-polyurea based rheology modifying agents is generally well known. In a typical process, mono hydroxyl containing compounds having different alkyl, alkenyl or aryl chains are reacted with excess diisocyanates in a ratio that yields isocyanate terminated urethanes. Excess diisocyanate, if present, is then removed to obtain an isocyanate terminated urethane polymer. The polyurea segments are introduced by reacting the isocyanate terminated urethanes with diamines. A suitable solvent is used to control the viscosity of the reaction medium during the reaction and to enable the product, polyurethane-polyurea, to exist in a solution form for ease of use in coating formulations. Without the aid of the solvent, the final rheology modifying agent is a solid or a highly viscous semisolid.

Solvents used for the preparation and storage of polyurethane-polyurea functional rheology modifying agents desirably have properties including a polar molecular structure, are aprotic and therefore free of any active or labile hydrogens, have good solvency for polar hard segments such as polyurethanes and polyurea, are thermally stable, are resistant to hydrolysis, and a have a high boiling point with a low vapor pressure.

Typical existing solvents include amides such as N-dialkyl acetamide ("DMA"), N-dialkyl formamide ("DMF"), N-dialkyl octanamide/decanamide mixtures (such as Hallcomid® M-8-10, available from Stepan Company) and N-dialkyl amide esters (such as Rhodiasolv Polarclean, available from Solvay), N-alkyl pyrrolidones such as N-methyl pyrrolidone (NMP), N-ethyl pyrrolidone (NEP), N-butyl pyrrolidone (NBP), N-octyl-2-pyrrolidone (NOP). However, amide esters are susceptible to hydrolysis, resulting in an acidic environment, long chain amides behaving more as surfactants than solvents, and may lack solvency. Many of the foregoing solvents are known to be either toxic or carcinogenic.

SUMMARY

The present disclosure relates to solvents that are suitable for use with polyurethane-polyurea based rheology modifying agents of the type which, in the past, have generally been formulated as solids or viscous liquids. The present solvents enable the rheology modifying agents to be prepared and formulated in a liquid or solution form more suited to prepare coating formulations that include polyurethane-polyurea based rheology modifying agents. The present solvents are N-alkyl substituted caprolactams, including, e.g., N-methyl caprolactam, N-ethyl caprolactam, N-butyl caprolactam, and the like, and mixtures thereof, which are aprotic, non-toxic, have good solvency for polar groups such as those found in polyurethanes and polyureas, are thermally stable, and have high boiling points and low vapor pressure.

The present disclosure provides a rheology modifying agent composition, including at least one polyurethane-polyurea polymer; and a solvent including one or more caprolactam-derived solvents according to the general formula:

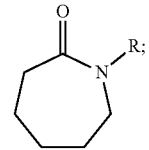

wherein R is a linear alkyl group of 1 or 2 unsubstituted carbons.

The solvent may be present in an amount between 20 wt. % and 95 wt. % of a total weight of the composition. The solvent may be present in an amount between 40 wt. % and 80 wt. % of a total weight of the composition.

The one or more caprolactam-derived solvents may include at least one of N-methyl caprolactam and N-ethyl caprolactam.

The one or more caprolactam-derived solvents may include N-methyl caprolactam and N-ethyl caprolactam. The solvent may further include N-butyl caprolactam. The N-butyl caprolactam may present in an amount ranging from 1 wt. % to 10 wt. % of the total or combined weight of the solvent.

The polyurethane-polyurea polymer may have the following formula:

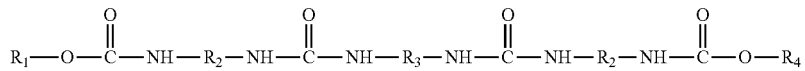

where $R_1$ and $R_4$ are the same or different straight or branched alkyl radicals or alkenyl radicals of 4-22 carbon atoms containing polyether, polyester or polycarbonate substituted alkyl chains;

$R_2$ is an aliphatic, cycloaliphatic, aromatic, and/or alkyl substituted aromatic group; and $R_3$ is an aliphatic straight chain or branched, cycloaliphatic, and/or alkyl substituted aromatic group.

The polyurethane-polyurea polymer may be synthesized from a diisocyanate having the following formula:

$$O=C=N-R_2-N=C=O$$

where $R_2$ is an aliphatic, cycloaliphatic, aromatic, and/or alkyl substituted aromatic group; and a diamine having the following formula:

$$H_2N-R_3-NH_2$$

where $R_3$ is $C_2$-$C_{12}$ aliphatic straight chain or branched, cycloaliphatic, and/or alkyl substituted aromatic group.

The present disclosure also provides a method for preparing any of the rheology modifying agent compositions described above, the method including providing an isocyanate terminated urethane polymer; and combining the isocyanate terminated urethane polymer with a diamine, a catalyst and a solvent to form a polyurethane-polyurea polymer, the solvent including one or more caprolactam-derived solvents according to the general formula:

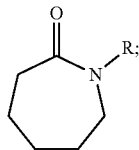

wherein R is a linear alkyl group of 1 or 2 unsubstituted carbons.

Combining the isocyanate terminated urethane polymer the diamine, the catalyst and the solvent may include mixing together the diamine, the catalyst, and the solvent to form a solution; and adding the isocyanate terminated urethane polymer to the solution. Mixing together the diamine, the catalyst, and the solvent to form a solution may include heating the diamine, the catalyst, and the solvent. Adding the isocyanate terminated urethane polymer to the solution may be done over at least one hour.

Providing the isocyanate terminated urethane polymer may include adding a mono hydroxyl containing compound to an excess of a diisocyanate to form a mixture including the mono hydroxyl containing compound and the diisocyanate; and stirring the mixture of the mono hydroxyl containing compound and the diisocyanate to form the isocyanate terminated urethane polymer. Providing the isocyanate terminated urethane polymer may further include removing the excess diisocyanate by vacuum distillation. The diisocyanate may have the following formula:

$$O=C=N-R_2-N=C=O$$

where $R_2$ is an aliphatic, cycloaliphatic, aromatic, and/or alkyl substituted aromatic group; and the diamine has the following formula:

$$H_2N-R_3-NH_2$$

where $R_3$ is $C_2$-$C_{12}$ aliphatic straight chain or branched, cycloaliphatic, and/or alkyl substituted aromatic group.

The catalyst may include lithium chloride.

The one or more caprolactam-derived solvents may include at least one of N-methyl caprolactam or N-ethyl caprolactam. The one or more caprolactam-derived solvents may include N-methyl caprolactam and N-ethyl caprolactam. The solvent may further include N-butyl caprolactam. The N-butyl caprolactam may present in an amount ranging from 1 wt. % to 10 wt. % of the total or combined weight of the solvent.

DETAILED DESCRIPTION

The present disclosure relates to solvents that are suitable for use with polyurethane-polyurea based rheology modifying agents of the type which, in the past, have generally been formulated as solids or viscous liquids. The present solvents enable the rheology modifying agents to be prepared and formulated in a liquid or solution form better suited to prepare coating formulations that include polyurethane-polyurea based rheology modifying agents. The solvents of the disclosure are generally N-alkyl substituted caprolactams, including N-methyl caprolactam, N-ethyl caprolactam, N-butyl caprolactam, and the like, and mixtures thereof, which are aprotic, non-toxic, have good solvency for polar groups such as those found in polyurethanes and polyureas, are thermally stable, and have high boiling points and low vapor pressure.

I. Polyurethane-Polyurea Polymers.

Polyurethane-polyurea polymers useful in the present rheology modifying agents may have the following Formula I:

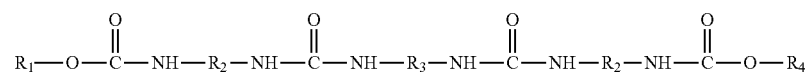

Formula I where $R_1$ and $R_4$ are the same or different straight or branched alkyl radicals or alkenyl radicals of 4-22 carbon atoms containing polyether, polyester or polycarbonate substituted alkyl chains;

$R_2$ is an aliphatic, cycloaliphatic, aromatic, and/or alkyl substituted aromatic group; and $R_3$ is an aliphatic straight chain or branched, cycloaliphatic, and/or alkyl substituted aromatic group.

The polyurethane-polyurea polymers may be synthesized from diisocyanates and diamines. Suitable diisocyanates may have the following Formula II:

$$O=C=N-R_2-N=C=O \qquad \text{Formula II}$$

where $R_2$ is an aliphatic, cycloaliphatic, aromatic, and/or alkyl substituted aromatic group.

The diisocyanates of Formula II encompasses aliphatic, cycloaliphatic, aromatic or aryl-aliphatic diisocyanates alone, or mixtures thereof. Specific examples of such diisocyanates include 1,4-tetra-methylene diisocyanate, 1,6-hexamethylene diisocyanate, 2,2,4-trimethyl-1,6-hexamethylene diisocyanate, 1,10-decamethyiene diisocyanate, 1,4-cyclohexane diisocyanate, isophorone diisocyanate, p-phenylene diisocyanate, m-phenylene diisocyanate, 2,6-toluene diisocyanate, 2,4-toluene diisocyanate and mixtures thereof, p- and m-xylylene diisocyanate, 4,4'-diisocyanato-dicyclohexyl-methane, 3,3'-dimethyl-4,4'-bisphenylene diisocyanate, 3,3'-dimethyl-diisocyanatodicyclohexylmethane, the isomer mixtures of 2,4'- and 4,4'-diisocyanatodiphenylmethane, and $C_{36}$ dimer. Also included are toluene diisocyanates having a 2,4-isomer fraction of from 50 to 100%, Suitable diamines may have the following Formula III:

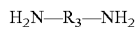     Formula III where $R_3$ is $C_2$-$C_{12}$ aliphatic straight chain or branched, cycloaliphatic, and/or alkyl substituted aromatic group.

In this manner, suitable diamines include linear diamines of chain length $C_2$ to $C_{12}$ which may be straight-chain or branched, such as, for example, 1,3-propanediamine, hexamethylenediamine, octamethylenediamine, diaminododecane or neopentanediamine, as well as cyclic diamines such as 4,4'-diaminodicyclohexylmethane or 3,3'-dimethyl-4,4'-diamino-dicyclohexylmethane, and aromatic-aliphatic diamines such as meta-xylylenediamine or para-xylylenediamine.

Mono hydroxyl containing compounds may have different alkyl, alkenyl or aryl chains, such as n-butanol or butyl triglycol, for example, are reacted with excess diisocyanates of the foregoing type in a ratio that yields isocyanate terminated urethanes. Any excess diisocyanate, if present, is then removed to obtain an isocyanate terminated urethane polymer. Then, polyurea segments are introduced by reacting the isocyanate terminated urethanes with diamines in the presence of the present solvents to control the viscosity of the reaction medium during the reaction and to enable the product, a polyurethane-polyurea polymer, to exist in a final solution form for ease of use in final, end use compositions of the type discussed below.

II. Solvents.

The present solvents are derived from caprolactam or (epsilon) ε-caprolactam, and include N-methyl caprolactam, N-ethyl caprolactam, N-butyl caprolactam, and combinations or mixtures thereof. These solvents have not been found to be, and are not expected to be, either reproductive toxins or carcinogens. In this manner, the present caprolactam-derived solvents, such as N-methyl caprolactam, N-ethyl caprolactam, and N-butyl caprolactam, are expected to be significantly safer than traditional solvents, such as NMP, for example, which have been used for formulating rheology modifying agents.

The present disclosure provides a composition including at least one polyurethane-polyurea polymer and one or more caprolactam-derived solvents. The caprolactam-derived solvents can be according to the following general Formula IV:

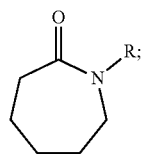     Formula IV in which R is a linear, alkyl group of 1, 2 or 4 unsubstituted carbons. For example, if R is a methyl group (—CH$_3$) then the caprolactam-derived solvent is N-methyl caprolactam according to Formula V:

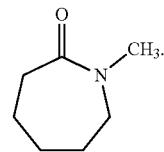     Formula V

If R is an ethyl group (—CH$_2$CH$_3$), then the caprolactam-derived solvent is N-ethyl caprolactam according to Formula VI:

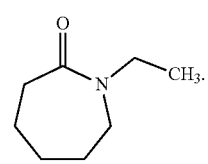     Formula VI

If R is a butyl group (—CH$_2$CH$_2$CH$_2$CH$_3$), then the caprolactam-derived solvent is N-butyl caprolactam according to Formula VII:

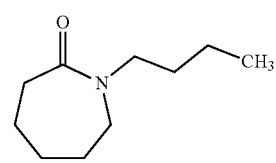     Formula VII

The solvent may also include combinations or mixtures of two or more of N-methyl caprolactam, N-ethyl caprolactam, and/or N-butyl caprolactam.

For example, the solvent may include two of the foregoing caprolactam-derived solvents, specifically, N-methyl caprolactam and N-ethyl caprolactam; N-methyl caprolactam and N-butyl caprolactam; or N-ethyl caprolactam and N-butyl caprolactam.

When the solvent includes N-methyl caprolactam and N-ethyl caprolactam, each of N-methyl caprolactam and N-ethyl caprolactam may be present in an amount as little as 1 weight percent (wt. %), 2 wt. %, 4 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as much as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, 96 wt. %, 98 wt. %, or 99 wt. % of the total or combined weight of the solvent, or within any range defined between any two of the preceding values, for example, and each of N-methyl caprolactam and N-ethyl caprolactam as a percentage of the total or combined weight of the solvent may range from 1 wt. % to 99 wt. %, 2 wt. % to 98 wt. %, 10 wt. % to 90 wt. %, 20 wt. % to 80 wt. %, 33 wt. % to 67 wt. %, or 40 wt. % to 60 wt. %.

When the solvent consists of N-methyl caprolactam and N-ethyl caprolactam, the N-methyl caprolactam may be present in an amount as little as 1 weight percent (wt. %), 2 wt. %, 4 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as much as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, 96 wt. %, 98 wt. %, or 99 wt. % of the total or combined weight of the solvent, or within any range defined between any two of the preceding values, for example, and N-methyl caprolactam as a percentage of the total or combined weight of the solvent may range from 1 wt. % to 99 wt. %, 2 wt. % to 98 wt. %, 10 wt. % to 90 wt. %, 20 wt. % to 80 wt. %, 33 wt. % to 67 wt. %, or 40 wt. % to 60 wt. %.

When the solvent includes N-methyl caprolactam and N-butyl caprolactam, the N-butyl caprolactam may be present in an amount as little as 1 wt. %, 2 wt. %, or 4 wt. %, or as much as 6 wt. %, 8 wt. %, or 10 wt. % of the total or combined weight of the solvent, or within any range defined between any two of the preceding values, for example, and N-butyl caprolactam as a percentage of the total or combined weight of the solvent may range from 1 wt. % to 10 wt. %, 2 wt. % to 8 wt. %, 4 wt. % to 6 wt. %, 1 wt. % to 4 wt. %, 1 wt. % to 6 wt. %, or 2 wt. % to 10 wt. %.

When the solvent consists of N-methyl caprolactam and N-butyl caprolactam, the N-butyl caprolactam may be present in an amount as little as 1 wt. %, 2 wt. %, or 4 wt. %, or as much as 6 wt. %, 8 wt. %, or 10 wt. % of the total or combined weight of the solvent, or within any range defined between any two of the preceding values, for example, and N-butyl caprolactam as a percentage of the total or combined weight of the solvent may range from 1 wt. % to 10 wt. %, 2 wt. % to 8 wt. %, 4 wt. % to 6 wt. %, 1 wt. % to 4 wt. %, 1 wt. % to 6 wt. %, or 2 wt. % to 10 wt. %.

When the solvent includes N-ethyl caprolactam and N-butyl caprolactam, the N-butyl caprolactam may be present in an amount as little as 1 wt. %, 2 wt. %, or 4 wt. %, or as much as 6 wt. %, 8 wt. %, or 10 wt. % of the total or combined weight of the solvent, or within any range defined between any two of the preceding values, for example, and N-butyl caprolactam as a percentage of the total or combined weight of the solvent may range from 1 wt. % to 10 wt. %, 2 wt. % to 8 wt. %, 4 wt. % to 6 wt. %, 1 wt. % to 4 wt. %, 1 wt. % to 6 wt. %, or 2 wt. % to 10 wt. %.

When the solvent consists of N-ethyl caprolactam and N-butyl caprolactam, the N-butyl caprolactam may be present in an amount as little as 1 wt. %, 2 wt. %, or 4 wt. %, or as much as 6 wt. %, 8 wt. %, or 10 wt. % of the total or combined weight of the solvent, or within any range defined between any two of the preceding values, for example, and N-butyl caprolactam as a percentage of the total or combined weight of the solvent may range from 1 wt. % to 10 wt. %, 2 wt. % to 8 wt. %, 4 wt. % to 6 wt. %, 1 wt. % to 4 wt. %, 1 wt. % to 6 wt. %, or 2 wt. % to 10 wt. %.

The solvent may include all three of the caprolactam-derived solvents, namely, N-methyl caprolactam, N-ethyl caprolactam, and N-butyl caprolactam. Optionally, the solvent may consist only one or two of the three foregoing caprolactam-derived solvents.

When the solvent includes all three of the caprolactam-derived solvents, N-methyl caprolactam and N-ethyl caprolactam may together or individually be present in an amount as little as 1 wt. %, 2 wt. %, 4 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as much as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, 96 wt. %, 98 wt. % of the total or combined weight of the solvent, or within any range defined between any two of the preceding values, for example, N-methyl caprolactam or N-ethyl caprolactam each as a percentage of the total or combined weight of the solvent may range from 1 wt. % to 98 wt. %, 2 wt. % to 96 wt. %, 10 wt. % to 80 wt. %, 15 wt. % to 70 wt. %, 20 wt. % to 60 wt. %, or 25 wt. % to 50 wt. %. The N-butyl caprolactam may be present in an amount as little as 1 wt. %, 2 wt. %, or 4 wt. %, or as much as 6 wt. %, 8 wt. %, or 10 wt. % of the total or combined weight of the solvent, or within any range defined between any two of the preceding values, for example, and N-butyl caprolactam as a percentage of the total or combined weight of the solvent may range from 1 wt. % to 10 wt. %, 2 wt. % to 8 wt. %, 4 wt. % to 6 wt. %, 1 wt. % to 4 wt. %, 1 wt. % to 6 wt. %, or 2 wt. % to 10 wt. %.

When the solvent consists of all three of the caprolactam-derived solvents, N-methyl caprolactam and N-ethyl caprolactam may together or individually be present in an amount as little as 1 wt. %, 2 wt. %, 4 wt. %, 6 wt. %, 8 wt. %, 10 wt. %, 15 wt. %, 20 wt. %, 25 wt. %, 30 wt. %, 33 wt. %, 35 wt. %, 40 wt. %, 45 wt. %, or 49 wt. %, or as much as 51 wt. %, 55 wt. %, 60 wt. %, 65 wt. %, 67 wt. %, 70 wt. %, 75 wt. %, 80 wt. %, 85 wt. %, 90 wt. %, 92 wt. %, 94 wt. %, 96 wt. %, 98 wt. % of the total or combined weight of the solvent, or within any range defined between any two of the preceding values, for example, N-methyl caprolactam or N-ethyl caprolactam as a percentage of the total or combined weight of the solvent may each range from 1 wt. % to 98 wt. %, 2 wt. % to 96 wt. %, 10 wt. % to 80 wt. %, 15 wt. % to 70 wt. %, 20 wt. % to 60 wt. %, or 25 wt. % to 50 wt. %. N-butyl caprolactam may be present in an amount as little as 1 wt. %, 2 wt. %, or 4 wt. %, or as much as 6 wt. %, 8 wt. %, or 10 wt. % of the total or combined weight of the solvent, or within any range defined between any two of the preceding values, for example, and N-butyl caprolactam as a percentage of the total or combined weight of the solvent may range from 1 wt. % to 10 wt. %, 2 wt. % to 8 wt. %, 4 wt. % to 6 wt. %, 1 wt. % to 4 wt. %, 1 wt. % to 6 wt. %, or 2 wt. % to 10 wt. %.

In the overall rheology modifying agent composition, the at least one polyurethane-polyurea polymer may be present in an amount as little as 5 wt. %, 20 wt. %, or 25 wt. %, or as great as 55 wt. %, 60 wt. %, or 80 wt. %, or within any range defined between any two of the preceding values, such as 5 to 80 wt. %, 20 to 60 wt. %, or 25 to 55 wt. %, for example, and the solvent may be present in an amount as little as 20 wt. %, 40 wt. %, or 45 wt. %, or as great as 75 wt. %, 80 wt. %, or 95 wt. %, or within any range defined between any two of the foregoing values, such as 20 to 95 wt. %, 40 to 80 wt. %, or 45 to 75 wt. %, for example.

The rheology modifying agent compositions of the disclosure advantageously have very good storage stability. The use of one or more of the solvents of the disclosure in such rheology modifying agent compositions makes it possible for such compositions to be formulated free of solids, cloudiness (turbidity) and gelling, thus having long term storage stability. The solvents of the present disclosure are polar, aprotic, have good solvency for polyurethane-polyurea polymers, and are non-reactive during the preparation of the final end use compositions.

The rheology modifying agent compositions formulated with the present solvents may be used as additives to end use compositions, such as liquid mixtures, for rheology control and to render such compositions thixotropic, and to generally provide thixotropic flow to prevent sealing of coating components and sagging of the coating while promoting leveling. Exemplary end use compositions include aqueous, solvent-borne and solvent-free coating compositions, PVC plastisols, epoxy-based coatings, and those based on unsaturated polyester resins. Specific applications include, for example, varnishes, pigment paste, polymer formulations, sealants, cosmetics, ceramics, lubricants, inks, and adhesives.

In an end use or finished rheology modifying agent composition, the rheology modifying agent composition formulated with the present solvent(s) may be present in an amount as little as 0.1 wt. %, 0.3 wt. % or 0.5 wt. %, or as high as 1 wt. %, 3 wt. % or 5 wt. %, or within any range defined between any two of the foregoing values, such as 0.1 to 5 wt. %, 0.3 to 3 wt. %, or 0.5 to 1 wt. %, for example, based on the total weight of the end use or finished composition.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

Examples

The following Examples demonstrate that the solvent and solvent combinations according to this disclosure perform at least as well as some typical existing solvents in the synthesis of urea-based rheology modifiers, without the problems associated with existing solvents, such as hydrolysis, poor solvency, and toxic or carcinogenic side effects. The urea-based rheology modifiers were synthesized by reacting one of three TDI adducts with either m-xylylene diamine or hexamethylene diamine. Three TDI adducts were prepared from toluene diisocyanate (TDI, 80% 2,4-isomer) and n-butanol (TDI-butanol), butyl triglycol (TDI-butyl triglycol), or polyethylene glycol monomethyl ether 400 (TDI-mPEG 400). The TDI, n-butanol, butyl triglycol and mPEG 400 were obtained from Sigma Aldrich.

Synthesis of TDI Adducts

Each of the TDI adducts was prepared by adding the n-butanol, butyl triglycol, or mPEG 400 to a reaction vessel fitted with an agitator containing an excess of TDI. The addition to the vessel was over a period of 2 hours at 30° C. After the end of the addition, stirring was continued for another 2 hours. After the additional 2 hours, excess TDI was removed by vacuum (0.1 mbar) distillation at from 150 to 170° C. The isocyanate (NCO) content of each TDI adduct was measured and found to be 16.47% for the TDI-butanol adduct, 10.58% for the TDI-butyl triglycol adduct, and 5.1% for the TDI-mPEG 400 adduct. Free TDI for each batch was found to be less than 0.5%.

Synthesis of Urethane-Urea Rheology Modifiers

For each of Examples 1-29, lithium chloride (LiCl) catalyst and either m-xylylene diamine or hexamethylene diamine were added to a 100 mL flask containing a solvent or a solvent combination as shown in Table 1. The flask was heated to 80° C. under nitrogen. Once all of the LiCl was observed to have dissolved, 14.5 g or 16 g of one of the TDI adducts was added slowly to the flask, as shown in Table 1. As the reaction is exothermic, the TDI adduct was added over a period of 1 hour for 14.5 g additions, and over a period of 1.5 hours for 16 g additions to keep the reaction temperature below 85° C. The temperature of the reaction mixture was monitored using a thermometer. After the addition of the TDI adduct, the reaction was continued at 80° C. for an additional 30 minutes and then allowed to cool to room temperature.

TABLE 1

| Example | Solvent Type | (g) | Amine Type | (g) | LiCl (g) | LiCl (wt. %) | TDI Adduct Type | (g) |
|---|---|---|---|---|---|---|---|---|
| 1 | N-methylcaprolactam | 21.2 | m-xylylene diamine | 4.4 | 0.45 | 1.07% | butanol | 16 |
| 2 | N-methyl pyrrolidone | 21.2 | m-xylylene diamine | 4.4 | 0.45 | 1.07% | butanol | 16 |
| 3 | N-butyl pyrrolidone | 21.2 | m-xylylene diamine | 4.4 | 0.45 | 1.07% | butanol | 16 |
| 4 | methyl-5-(dimethylamino)-2-methyl-5-oxopentaoate | 21.2 | m-xylylene diamine | 4.4 | 0.45 | 1.07% | butanol | 16 |
| 5 | N-methylcaprolactam | 20.2 | m-xylylene diamine | 3.4 | 0.3 | 0.75% | butanol | 16 |
| 6 | N-ethylcaprolactam | 20.2 | m-xylylene diamine | 3.4 | 0.3 | 0.75% | butanol | 16 |
| 7 | N-butylcaprolactam | 20.2 | m-xylylene diamine | 3.4 | 0.3 | 0.75% | butanol | 16 |
| 8 | N-methylcaprolactam N-ethylcaprolactam | 10.1 10.1 | m-xylylene diamine | 3.4 | 0.3 | 0.75% | butanol | 16 |
| 9 | N-methyl pyrrolidone | 20.2 | m-xylylene diamine | 3.4 | 0.3 | 0.75% | butanol | 16 |
| 10 | N-methylcaprolactam | 20.2 | hexamethylene diamine | 3.75 | 0.3 | 0.75% | butanol | 16 |
| 11 | N-methylcaprolactam | 20.2 | hexamethylene diamine | 3.75 | 0.3 | 0.75% | butanol | 16 |
| 12 | N-methylcaprolactam | 20.2 | m-xylylene diamine | 2.8 | 0.42 | 1.07% | butyl triglycol | 16 |
| 13 | N-methyl pyrrolidone | 20.2 | m-xylylene diamine | 2.8 | 0.42 | 1.07% | butyl triglycol | 16 |
| 14 | N-butyl pyrrolidone | 20.2 | m-xylylene diamine | 2.8 | 0.42 | 1.07% | butyl triglycol | 16 |
| 15 | methyl-5-(dimethylamino)-2-methyl-5-oxopentaoate | 20.2 | m-xylylene diamine | 2.8 | 0.42 | 1.07% | butyl triglycol | 16 |
| 16 | N-methylcaprolactam | 20.8 | hexamethylene diamine | 2.2 | 0.49 | 1.29% | butyl triglycol | 14.5 |
| 17 | N-ethylcaprolactam | 20.8 | hexamethylene diamine | 2.2 | 0.49 | 1.29% | butyl triglycol | 14.5 |
| 18 | N-butylcaprolactam | 20.8 | hexamethylene diamine | 2.2 | 0.49 | 1.29% | butyl triglycol | 14.5 |
| 19 | N-ethylcaprolactam N-butylcaprolactam | 10.4 10.4 | hexamethylene diamine | 2.2 | 0.49 | 1.29% | butyl triglycol | 14.5 |
| 20 | N-methylcaprolactam N-butylcaprolactam | 10.4 10.4 | hexamethylene diamine | 2.2 | 0.49 | 1.29% | butyl triglycol | 14.5 |
| 21 | N-methyl pyrrolidone | 20.8 | hexamethylene diamine | 2.2 | 0.49 | 1.29% | butyl triglycol | 14.5 |
| 22 | N-methylcaprolactam | 20.2 | m-xylylene diamine | 1.9 | 0.42 | 1.09% | mPEG 400 | 16 |
| 23 | N-ethylcaprolactam N-butylcaprolactam | 10.1 10.1 | m-xylylene diamine | 1.9 | 0.42 | 1.09% | mPEG 400 | 16 |
| 24 | N-methyl pyrrolidone | 27.2 | m-xylylene diamine | 1.9 | 0.42 | 0.92% | mPEG 400 | 16 |
| 25 | N-butyl pyrrolidone | 20.2 | m-xylylene diamine | 1.9 | 0.42 | 1.09% | mPEG 400 | 16 |
| 26 | methyl-5-(dimethylamino)-2-methyl-5-oxopentaoate | 20.2 | m-xylylene diamine | 1.9 | 0.42 | 1.09% | mPEG 400 | 16 |

TABLE 1-continued

| | Solvent | | Amine | | LiCl | | TDI Adduct | |
|---|---|---|---|---|---|---|---|---|
| Example | Type | (g) | Type | (g) | (g) | (wt. %) | Type | (g) |
| 27 | N-ethylcaprolactam | 20.8 | hexamethylene diamine | 1.5 | 0.49 | 1.31% | mPEG 400 | 14.5 |
| 28 | N-methylcaprolactam<br>N-butylcaprolactam | 10.4<br>10.4 | hexamethylene diamine | 1.5 | 0.49 | 1.31% | mPEG 400 | 14.5 |
| 29 | N-methyl pyrrolidone | 20.8 | hexamethylene diamine | 1.5 | 0.49 | 1.31% | mPEG 400 | 14.5 |

The resulting urethane-urea solutions were observed to be yellowish in color for those formed from TDI-butanol and TDI-butyl triglycol adducts, and dark brown for those formed from TDI-mPEG 400 adducts. The urethane-urea solutions had solids contents ranging from about 40 wt. % to about 50 wt. %. The urethane-urea solutions were evaluated for stability at room temperature for an extended period of time, or until the solution gelled. The results are shown in Table 2.

Examples 1-11 are the urethane-urea solutions formed from the TDI-butanol adduct. As shown in Table 2, all solutions formed from the TDI-butanol adduct and m-xylylene diamine gelled within a week. Solutions including N-methylcaprolactam (Examples 1, 5), N-ethylcaprolactam (Example 6), N-butylcaprolactam (Example 7), and mixtures of N-methylcaprolactam and N-ethylcaprolactam (Example 8) performed as well as solutions including N-methyl pyrrolidone (Examples 2, 9), with all gelling at from four to six days. Surprisingly, solutions including N-butyl pyrrolidone (Example 3) or methyl-5-(dimethylamino)-2-methl-5-oxopentoate (Example 4) performed far worse. The solution including N-butyl pyrrolidone gelled in an hour, and the solution including methyl-5-(dimethylamino)-2-methyl-5-oxopentoate gelled during the reaction. Variations in the mole ratio of TDI-butanol to amine did not appear to have an effect on the stability of the solutions (compare Examples 1 and 2 to examples 5 and 9). However, as shown in Examples 10 and 11, forming the urethane-urea solutions with hexamethylene diamine instead of m-xylylene diamine did increase the stability of the solution, resulting in longer gelling times of twelve to twenty-eight days.

Examples 12-21 are the urethane-urea solutions formed from the TDI-butyl triglycol adduct. As shown in Table 2, all solutions formed from the TDI-butyl triglycol adduct and either m-xylylene diamine or hexamethylene diamine were stable for an extended period of time with no precipitates observed, although the solutions including N-butyl pyrrolidone (Example 14) or methyl-5-(dimethylamino)-2-methyl-5-oxopentoate (Example 15) were only observed for a day.

TABLE 2

| Example | Solvent Type | Amine Type | LiCl (wt. %) | TDI Adduct Type | TDI Adduct:Amine (mole ratio) | Stability Level | Time (days) |
|---|---|---|---|---|---|---|---|
| 1 | N-methylcaprolactam | m-xylylene diamine | 1.07% | butanol | 2.0 | Gelled | 4 |
| 2 | N-methyl pyrrolidone | m-xylylene diamine | 1.07% | butanol | 2.0 | Gelled | 4 |
| 3 | N-butyl pyrrolidone | m-xylylene diamine | 1.07% | butanol | 2.0 | Gelled | <1 |
| 4 | methyl-5-(dimethylamino)-2-methyl-5-oxopentaoate | m-xylylene diamine | 1.07% | butanol | 2.0 | Gelled | <1 |
| 5 | N-methylcaprolactam | m-xylylene diamine | 0.75% | butanol | 2.6 | Gelled | 4 |
| 6 | N-ethylcaprolactam | m-xylylene diamine | 0.75% | butanol | 2.6 | Gelled | 4 |
| 7 | N-butylcaprolactam | m-xylylene diamine | 0.75% | butanol | 2.6 | Gelled | 3 |
| 8 | N-methylcaprolactam<br>N-ethylcaprolactam | m-xylylene diamine | 0.75% | butanol | 2.6 | Gelled | 6 |
| 9 | N-methyl pyrrolidone | m-xylylene diamine | 0.75% | butanol | 2.6 | Gelled | 5 |
| 10 | N-methylcaprolactam | hexamethylene diamine | 0.75% | butanol | 2.0 | Gelled | 28 |
| 11 | N-methylcaprolactam | hexamethylene diamine | 0.75% | butanol | 2.0 | Gelled | 12 |
| 12 | N-methylcaprolactam | m-xylylene diamine | 1.07% | butyl triglycol | 2.0 | Solution[1] | 28 |
| 13 | N-methyl pyrrolidone | m-xylylene diamine | 1.07% | butyl triglycol | 2.0 | Solution[1] | 27 |
| 14 | N-butyl pyrrolidone | m-xylylene diamine | 1.07% | butyl triglycol | 2.0 | Solution[1] | <1 |
| 15 | methyl-5-(dimethylamino)-2-methyl-5-oxopentaoate | m-xylylene diamine | 1.07% | butyl triglycol | 2.0 | Solution[1] | <1 |
| 16 | N-methylcaprolactam | hexamethylene diamine | 1.29% | butyl triglycol | 2.0 | Solution[1] | 42 |
| 17 | N-ethylcaprolactam | hexamethylene diamine | 1.29% | butyl triglycol | 2.0 | Solution[1] | 40 |
| 18 | N-butylcaprolactam | hexamethylene diamine | 1.29% | butyl triglycol | 2.0 | Solution[1] | 22 |
| 19 | N-ethylcaprolactam<br>N-butylcaprolactam | hexamethylene diamine | 1.29% | butyl triglycol | 2.0 | Solution[1] | 42 |
| 20 | N-methylcaprolactam<br>N-butylcaprolactam | hexamethylene diamine | 1.29% | butyl triglycol | 2.0 | Solution[1] | 26 |
| 21 | N-methyl pyrrolidone | hexamethylene diamine | 1.29% | butyl triglycol | 2.0 | Solution[1] | 23 |
| 22 | N-methylcaprolactam | m-xylylene diamine | 1.09% | mPEG 400 | 2.0 | Solution[2] | 15 |
| 23 | N-ethylcaprolactam<br>N-butylcaprolactam | m-xylylene diamine | 1.09% | mPEG 400 | 2.0 | Solution[2] | 14 |
| 24 | N-methyl pyrrolidone | m-xylylene diamine | 0.92% | mPEG 400 | 2.0 | Solution[1] | 16 |
| 25 | N-butyl pyrrolidone | m-xylylene diamine | 1.09% | mPEG 400 | 2.0 | Solution[2] | 5 |
| 26 | methyl-5-(dimethylamino)-2-methyl-5-oxopentaoat | m-xylylene diamine | 1.09% | mPEG 400 | 2.0 | Solution[3] | 5 |

TABLE 2-continued

| Example | Solvent Type | Amine Type | LiCl (wt. %) | TDI Adduct Type | TDI Adduct:Amine (mole ratio) | Stability Level | Time (days) |
|---|---|---|---|---|---|---|---|
| 27 | N-ethylcaprolactam | hexamethylene diamine | 1.31% | mPEG 400 | 2.0 | Solution[2] | 9 |
| 28 | N-methylcaprolactam N-butylcaprolactam | hexamethylene diamine | 1.31% | mPEG 400 | 2.0 | Solution[2] | 9 |
| 29 | N-methyl pyrrolidone | hexamethylene diamine | 1.31% | mPEG 400 | 2.0 | Solution[1] | 12 |

[1] No precipitates observed
[2] Some precipitates observed - dissolved on shaking
[3] Lot of precipitates Examples 22-29 are the urethane-urea solutions formed from the TDI-mPEG 400 adduct. As shown in Table 2, solutions including N-methylcaprolactam (Example 22), N-ethylcaprolactam (Example 27), mixtures of N-methylcaprolactam and N-butylcaprolactam (Example 28) and mixtures of N-ethylcaprolactam and N-butylcaprolactam (Example 23) performed nearly as well as solutions including N-methyl pyrrolidone (Examples 24, 29). While no precipitates formed in the solutions including N-methyl pyrrolidone, the other solutions did form some precipitates, which dissolved upon shaking. The solution including N-butyl pyrrolidone (Example 25) also formed some precipitates which dissolved upon shaking. Surprisingly, the solution including methyl-5-(dimethylamino)-2-methyl-5-oxopentoate (Example 26) formed a significantly higher level of precipitates than any of the other solutions.

Thus, the Examples demonstrate that the solvent and solvent combinations according to this disclosure perform generally as well as typical existing solvents in the synthesis of urea-based rheology modifiers, such as N-methyl pyrrolidone, and may perform significantly better than other typical existing solvents, such as N-butyl pyrrolidone and methyl-5-(dimethylamino)-2-methyl-5-oxopentoate, without the problems associated with existing solvents, such as hydrolysis, poor solvency, and toxic or carcinogenic side effects.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A rheology modifying agent composition, comprising:
at least one polyurethane-polyurea polymer, having the following formula:

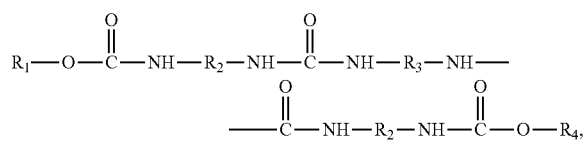

where $R_1$ and $R_4$ are the same or different straight or branched alkyl radicals or alkenyl radicals of 4-22 carbon atoms containing polyether, polyester or polycarbonate substituted alkyl chains;
$R_2$ is an aliphatic, cycloaliphatic, aromatic, and/or alkyl substituted aromatic group; and
$R_3$ is an aliphatic straight chain or branched, cycloaliphatic, and/or alkyl substituted aromatic group; and
a solvent including one or more caprolactam-derived solvents according to the general formula:

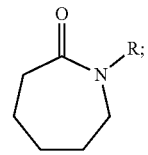

wherein R is a linear alkyl group of 1 or 2 unsubstituted carbons.

2. The composition of claim 1, wherein the solvent is present in an amount between 20 wt. % and 95 wt. % of a total weight of the composition.

3. The composition of claim 1, wherein the solvent is present in an amount between 40 wt. % and 80 wt. % of a total weight of the composition.

4. The composition of claim 1, wherein the solvent further includes N-butyl caprolactam present in an amount ranging from 1 wt. % to 10 wt. % of the total or combined weight of the solvent.

5. The composition of claim 1, wherein the polyurethane-polyurea polymer is synthesized from:
a diisocyanate having the following formula:

where $R_2$ is an aliphatic, cycloaliphatic, aromatic, and/or alkyl substituted aromatic group; and
a diamine having the following formula:

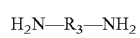

where $R_3$ is $C_2$-$C_{12}$ aliphatic straight chain or branched, cycloaliphatic, and/or alkyl substituted aromatic group.

6. A method for preparing a rheology modifying agent composition, the method comprising:
providing an isocyanate terminated urethane polymer, wherein providing the isocyanate terminated urethane polymer comprises:
adding a mono hydroxyl containing compound to an excess of a diisocyanate to form a mixture including the mono hydroxyl containing compound and the diisocyanate; and
stirring the mixture of the mono hydroxyl containing compound and the diisocyanate to form the isocyanate terminated urethane polymer; and
combining the isocyanate terminated urethane polymer with a diamine, a catalyst and a solvent to form a polyurethane-polyurea polymer, the solvent including one or more caprolactam-derived solvents according to the general formula:

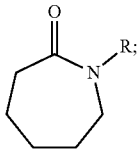

wherein R is a linear alkyl group of 1 or 2 unsubstituted carbons.

7. The method of claim 6, wherein combining the isocyanate terminated urethane polymer the diamine, the catalyst and the solvent comprises:
mixing together the diamine, the catalyst, and the solvent to form a solution; and
adding the isocyanate terminated urethane polymer to the solution.

8. The method of claim 7, wherein mixing together the diamine, the catalyst, and the solvent to form a solution comprises heating the diamine, the catalyst, and the solvent.

9. The method of claim 6, wherein adding the isocyanate terminated urethane polymer to the solution is done over at least one hour.

10. The method of claim 6, further comprising removing the excess diisocyanate by vacuum distillation.

11. The method of claim 6, wherein the diisocyanate has the following formula:

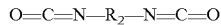

where $R_2$ is an aliphatic, cycloaliphatic, aromatic, and/or alkyl substituted aromatic group; and
a diamine having the following formula:

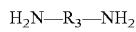

where $R_3$ is $C_2$-$C_{12}$ aliphatic straight chain or branched, cycloaliphatic, and/or alkyl substituted aromatic group.

12. The method of claim 6, wherein the catalyst includes lithium chloride.

13. The method of claim 6, wherein the one or more caprolactam-derived solvents include N-methyl caprolactam and N-ethyl caprolactam.

14. The method of claim 6, wherein the solvent further includes N-butyl caprolactam, the N-butyl caprolactam present in an amount ranging from 1 wt. % to 10 wt. % the total or combined weight of the solvent.

15. An end-use composition comprising:
a varnish, a pigment paste, a sealant, a cosmetic, a ceramic, a lubricant, an ink, an adhesive, a PVC plastisol coating, an epoxy coating, or a coating based on unsaturated polyester resins; and
a rheology modifying agent composition, the rheology modifying composition comprising:
at least one polyurethane-polyurea polymer, having the following formula:

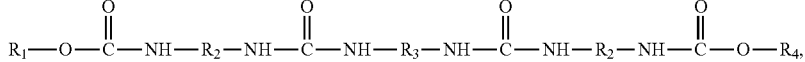

where $R_1$ and $R_4$ are the same or different straight or branched alkyl radicals or alkenyl radicals of 4-22 carbon atoms containing polyether, polyester or polycarbonate substituted alkyl chains;
$R_2$ is an aliphatic, cycloaliphatic, aromatic, and/or alkyl substituted aromatic group; and
$R_3$ is an aliphatic straight chain or branched, cycloaliphatic, and/or alkyl substituted aromatic group; and
a solvent including one or more caprolactam-derived solvents according to the general formula:

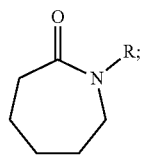

wherein R is a linear alkyl group of 1 or 2 unsubstituted carbons.

16. The end-use composition of claim 15, wherein the rheology modifying agent composition is present in amount from 0.1 wt. % to 5 wt. % of the total weight of the end-use composition.

17. The end-use composition claim 15, wherein the end-use composition is thixotropic.

18. The end-use composition of claim 15, wherein the solvent is present in an amount between 20 wt. % and 95 wt. % of a total weight of the rheology modifying composition.

19. The end-use composition of claim 15, wherein the solvent further includes N-butyl caprolactam present in an amount ranging from 1 wt. % to 10 wt. % of the total or combined weight of the solvent of the rheology modifying composition.

20. The end-use composition of claim 15, wherein the polyurethane-polyurea polymer of the rheology modifying composition is synthesized from:
a diisocyanate having the following formula:

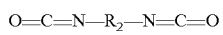

where $R_2$ is an aliphatic, cycloaliphatic, aromatic, and/ or alkyl substituted aromatic group; and
a diamine having the following formula:

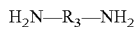

where $R_3$ is $C_2$-$C_{12}$ aliphatic straight chain or branched, cycloaliphatic, and/or alkyl substituted aromatic group.

\* \* \* \* \*